(12) United States Patent
Hirata (10) Patent No.: US 7,457,052 B2
(45) Date of Patent: Nov. 25, 2008

(54) LIGHT SHIELD SHEET, OPTICAL APPARATUS, AND METHOD OF MANUFACTURING LIGHT SHIELD SHEET

(75) Inventor: Hiroyuki Hirata, Ibaraki (JP)

(73) Assignee: Hitachi Maxwell, Ltd., Ibaraki (JP)

( * ) Notice: Subject to any disclaimer, the term of this patent is extended or adjusted under 35 U.S.C. 154(b) by 64 days.

(21) Appl. No.: 11/197,509

(22) Filed: Aug. 5, 2005

(65) Prior Publication Data
US 2006/0018041 A1    Jan. 26, 2006

(30) Foreign Application Priority Data
Jul. 22, 2004  (JP) ............................. 2004-214461
Mar. 24, 2005  (JP) ............................. 2005-086127

(51) Int. Cl.
G02B 9/00    (2006.01)

(52) U.S. Cl. ...................... 359/738; 359/739; 359/793

(58) Field of Classification Search ................. 359/740, 359/642, 641, 739, 738
See application file for complete search history.

(56) References Cited

U.S. PATENT DOCUMENTS

| | | | | |
|---|---|---|---|---|
| 6,429,422 B1* | 8/2002 | Bohn | .......................... | 250/234 |
| 6,597,401 B1* | 7/2003 | Maruyama | .................. | 348/335 |
| 6,802,420 B2* | 10/2004 | Fukugawa et al. | .......... | 206/410 |
| 7,221,524 B2* | 5/2007 | Ye et al. | ..................... | 359/819 |
| 7,231,143 B2* | 6/2007 | Toji | ............................ | 396/111 |

FOREIGN PATENT DOCUMENTS

| | | |
|---|---|---|
| JP | A-09-096850 | 4/1997 |
| JP | A-2003-270506 | 9/2003 |

* cited by examiner

*Primary Examiner*—Timothy J Thompson
(74) *Attorney, Agent, or Firm*—Oliff & Berridge, PLC (57) ABSTRACT

A light shield sheet has an aperture that restricts a range of light transmission. In the light shield sheet, the thickness of the inner circumference in the periphery of the aperture is smaller than the thickness of the outer circumference.

12 Claims, 9 Drawing Sheets

LIGHT SHIELD SHEET, OPTICAL APPARATUS, AND METHOD OF MANUFACTURING LIGHT SHIELD SHEET

BACKGROUND OF THE INVENTION

1. Field of the Invention

The present invention relates to a light shield sheet, an optical apparatus, and a method of manufacturing a light shield sheet. Particularly, the present invention relates to a light shield sheet used for a camera, an optical apparatus, and a method of manufacturing a light shield sheet.

2. Description of Related Art

With rapid spread of digital cameras and mobile phones with digital camera functions, optical components used for these optical apparatus are on the improvement. One of important techniques for the optical apparatus is to eliminate unwanted incident light to prevent flare or ghost from occurring in an image.

The flare is a phenomenon where a bright part appears in an image, which is likely to occur by strong incident light entering a lens, such as when a camera faces a light source. The ghost is a phenomenon where an object image is formed in a different position from the right position due to multiple reflection of incident light or the like.

In order to avoid flare and ghost, various components have been researched and developed, including a lens-barrel and a lens stop. For example, Japanese Unexamined Patent Publication No. 2003-270506 describes a technique that places a light shield member with a stopper at its end inside a lens-barrel so as to prevent ghost from occurring.

Though these techniques considerably reduce ghost and flare, complete prevention has not been achieved. For example, since the light shield sheet used for a lens stop has a certain thickness, incident light is reflected on its side face to cause ghost or flare. However, this thickness is necessary in terms of essential light shielding effect, mechanical strength, shape stability, reliability in environments, handling ability in assembling, and so on.

The present invention has been accomplished to solve the above problems and an object of the invention is thus to provide a light shield sheet having a necessary thickness and capable of preventing ghost and flare from occurring, an optical apparatus, and a method of manufacturing a light shield sheet.

SUMMARY OF THE INVENTION

To these ends, according to an aspect of the present invention, there is provided a light shield sheet having an aperture that restricts a range of light transmission, wherein a thickness of an inner circumference of the light shield sheet in a periphery of the aperture is smaller than a thickness of an outer circumference of the light shield sheet. This structure enables to prevent flare and ghost from occurring due to light reflection on the aperture inner side surface.

According to another aspect of the present invention, there is provided a light shield sheet having an aperture that restricts a range of light transmission, wherein a thickness of an outer circumference of the light shield sheet is 50 μm and above, and a thickness of an inner circumference of the light shield sheet in a periphery of the aperture is 70% and less of the thickness of the outer circumference of the light shield sheet. This structure enables to prevent flare and ghost from occurring due to light reflection on the aperture inner side surface.

In these light shield sheets, the periphery of the aperture may be thinned by pressurization.

According to another aspect of the present invention, there is provided an optical apparatus that includes a light shield sheet restricting a range of incident light by an aperture, a lens refracting incident light, and a sensor receiving incident light restricted by the light shield sheet and refracted by the lens, wherein a thickness of an inner circumference of the light shield sheet in a periphery of the aperture is smaller than a thickness of an outer circumference of the light shield sheet. This structure enables to prevent flare and ghost from occurring due to light reflection on the aperture inner side surface.

According to another aspect of the present invention, here is provided an optical apparatus that includes a light shield sheet restricting a range of incident light by an aperture, a lens refracting incident light, and a sensor receiving incident light restricted by the light shield sheet and refracted by the lens, wherein a thickness of an outer circumference of the light shield sheet is 50 μm and above, and a thickness of an inner circumference of the light shield sheet in a periphery of the aperture is 70% and less of the thickness of the outer circumference of the light shield sheet. This structure enables to prevent flare and ghost from occurring due to light reflection on the aperture inner side surface.

In these optical apparatus, the periphery of the aperture may be thinned by pressurization.

Further, in these optical apparatus, the lens may be composed of at least two lenses, and the light shield sheet may be placed between the lenses. This structure enables to efficiently prevent flare and ghost from occurring.

These optical apparatus may be used for a camera.

According to another aspect of the present invention, there is provided a method of manufacturing a light shield sheet that restricts a range of light transmission by an aperture, which includes producing a light shield sheet having the aperture, and applying pressure to an inner circumference of the light shield sheet in a periphery of the aperture to reduce a thickness. This method enables to manufacture a light shield sheet capable of preventing flare and ghost from occurring due to light reflection on the aperture inner side surface.

According to another aspect of the present invention, there is provided a method of manufacturing a light shield sheet that restricts a range of light transmission by an aperture, which includes producing a light shield sheet with a thickness of 50 μm and above having the aperture, and applying pressure to an inner circumference of the light shield sheet in a periphery of the aperture until a thickness of the inner circumference of the light shield sheet in the periphery of the aperture is reduced to 70% and less of the thickness before pressurization. This method enables to manufacture a light shield sheet capable of preventing flare and ghost from occurring due to light reflection on the aperture inner side surface.

According to another aspect of the present invention, there is provided a method of manufacturing a light shield sheet that restricts a range of light transmission by an aperture, which includes producing a sheet-like member having a light shielding effect, applying pressure to a periphery of an area where the aperture is to be formed in the sheet-like member to reduce a thickness, and cutting away the aperture and an outer circumference after reducing the thickness of the periphery of the aperture. This method enables to perform a process of applying pressure efficiently.

The present invention can provide a light shield sheet having a necessary thickness and capable of preventing ghost and flare from occurring, an optical apparatus, and a method of manufacturing a light shield sheet.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Lens stops involve a flare stop, a field stop and an aperture stop. The flare stop avoids unwanted reflection, glare and diffusion inside a lens-barrel or on a lens edge for preventing ghost and flare. The field stop restricts a viewing field to a rectangular sensor. The aperture stop creates a conjugate point where light emitted from a particular point produces an image at another point to restrict an aperture focal power.

Figure 1:
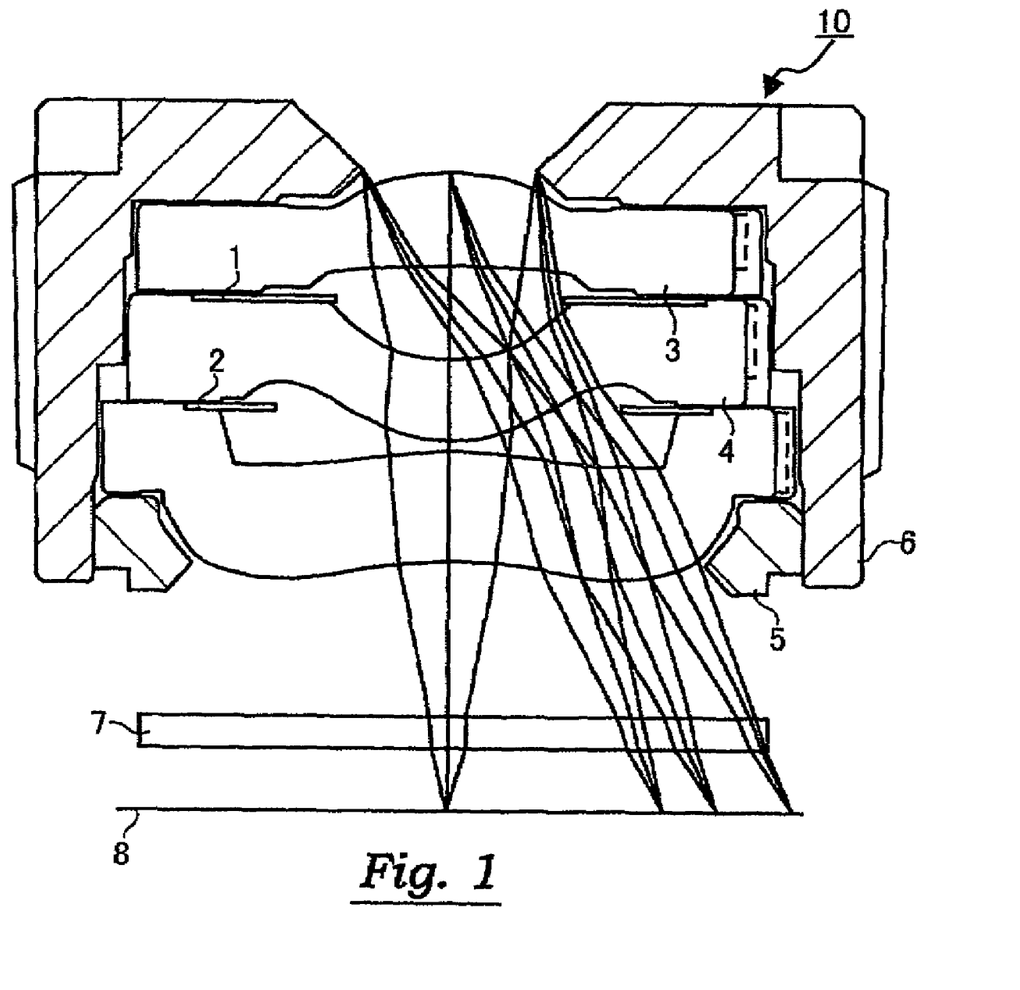
FIG. 1 is a view showing the structure of an optical apparatus of the present invention.

FIG. 1 is the side view of an optical apparatus that uses a light shield sheet as a flare stop according to the first embodiment. An optical apparatus 10 is used for a mobile phone 10 and a digital camera. As shown in FIG. 1, the optical apparatus 10 has light shield sheets 1 and 2, lenses 3, 4 and 5, a lens-barrel 6, a filter 7, and a sensor 8. A part of the lens-barrel 6 which covers the surface of the lens 1 functions as an aperture stop.

The light shield sheet 1 is a disc-like sheet that has an aperture in its inner part. The light shield sheet 1 is mainly made of plastic such as PET (drawn polyester) and carbon black. The light shield sheet 1 has a light shielding effect and functions as a stop to adjust the range of incident light. In view of a simple thickness of the flare stop, a sheet that contains the same amount of carbon black has a lower light shielding effect if it is thinner and has a higher light shielding effect if it is thicker. The light shield sheet 2 is also a disc-like sheet with an aperture in its inner part and mainly made of plastic such as PET and carbon black. The light shield sheet 2 also has a light shielding effect and prevents light transmission that causes flare and ghost. The light shield sheet 1 is placed between the lens 3 and the lens 4, and the light shield sheet 2 is placed between the lens 4 and the lens 5. Each light shield sheet is fixed by the upper and lower lenses, thus requiring no adhesive.

The lenses 3, 4 and 5 are made of amorphous polyolefin resin, polycarbonate resin, or acrylic resin and formed by injection molding. These lenses refract incident light in combination to make it focused on the sensor 8. The lenses 3, 4 and 5 fix the light shield sheets 1 and 2 placed therebetween. The positions of the lenses 3, 4 and 5 are fixed by the lens-barrel 6.

The lens-barrel 6 fixes the positions of the lenses 3, 4 and 5. The lenses 3, 4 and 5 are placed inside the lens-barrel 6. The glass filter 7 selectively allows visible wavelength light contained in the incident light incoming through the lenses 3, 4, and 5 to pass through. The sensor 8 has a Charge Coupled Device (CCD), a Complementary Metal-Oxide Semiconductor (CMOS) and so on to convert the light into an electrical signal. The electrical signal is then converted into analog data or digital data that are components of image data shot by a camera.

The flare and ghost to be eliminated in this invention are described hereinafter. In the first embodiment, incident light is normally refracted by the lenses 3, 4 and 5 and then light different from visible light is blocked by the glass filter 7 so that the visible light reaches the sensor 8 as shown in FIG. 1. The light shield sheets 1 and 2 are shaped and arranged so as to shield unwanted light. Further, the light shield sheets 1 and 2 are shaped and arranged so as not to obstruct a light transmission area that is determined by the aperture stop.

However, some incident light is reflected on the inner surface of the lens-barrel 6 or on the front surfaces or the side surfaces of the lenses 3, 4 and 5. If such light reaches the sensor 8, it appears bright white to cause flare to occur. Further, if an image is formed by the reflected light, it causes ghost to occur.

In order to avoid the flare and ghost, techniques to roughen or blacken the inner surface of the lens-barrel and the side surface of the lens have been performed. However, the flare and ghost can be caused by other factors. One cause is reflection of light on an aperture inner side surface of the light shield sheet.

Figure 2:
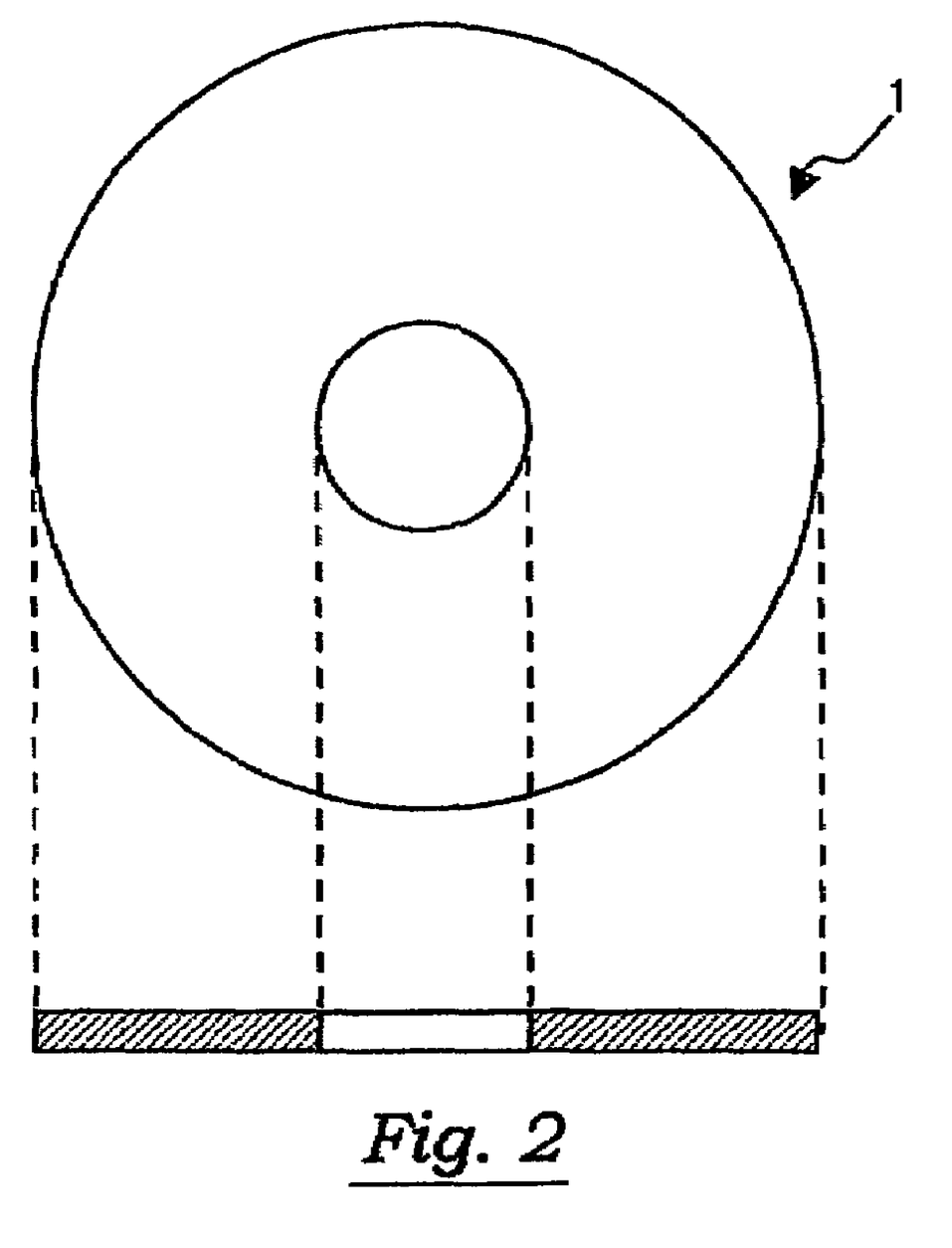
FIG. 2 shows a top view and a sectional view of a light shield sheet of the present invention.

A light shield sheet manufactured by a general process has the shape shown in FIG. 2. FIG. 2 shows a top view and a sectional view of the light shield sheet. The light shield sheet has a uniform thickness. The light shield sheet is preferably 50 to 200 µm thick since a too thin sheet has insufficient light shielding effect, mechanical strength, shape stability, reliability in environments, handling ability in assembling and so on. However, this thickness causes light to be reflected on the aperture internal face, which causes flare and ghost.

Figure 3A:
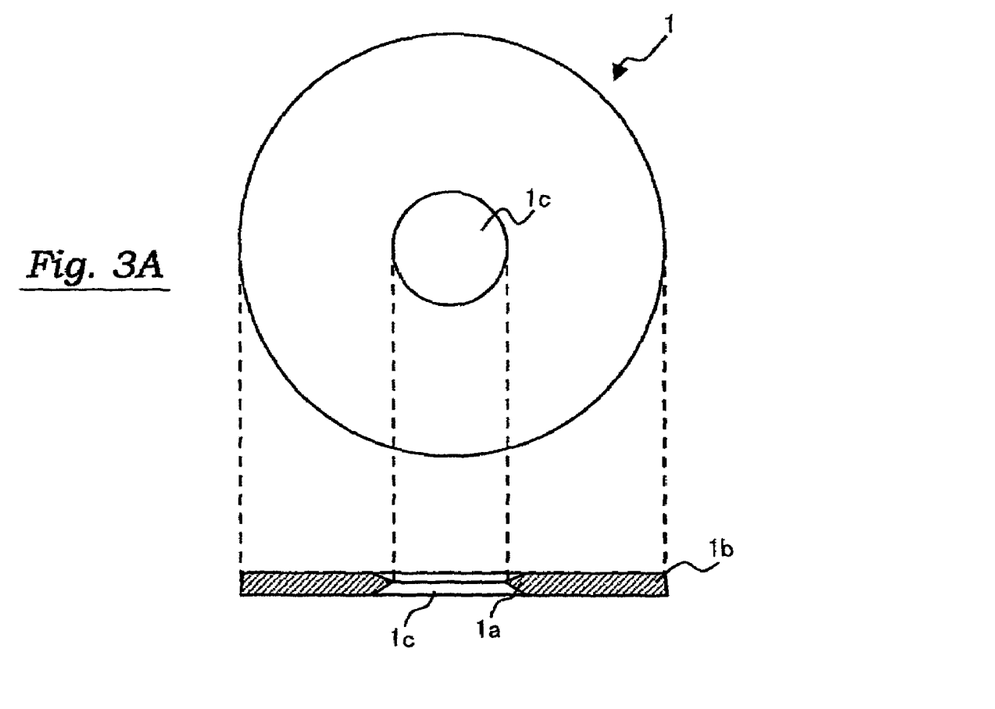
FIG. 3A shows a top view and a sectional view of a light shield sheet of the present invention.
Figure 3B:
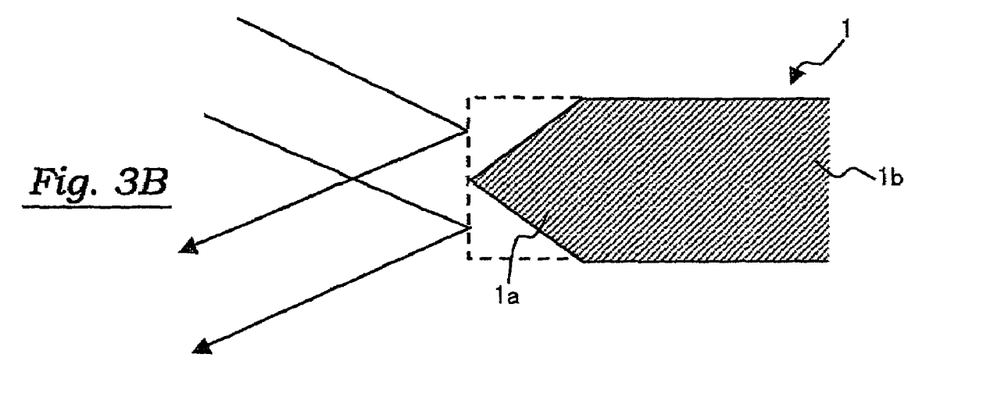
FIG. 3B is an enlarged view of an aperture inner side surface of a light shield sheet of the present invention.

In order to prevent the reflection on the side surface without reducing the entire sheet thickness, the present invention performs a processing of applying pressure to the inner side surface of the aperture (inner circumference 1a of the light shield sheet) and its vicinity from above and below to make this part thinner. FIGS. 3A and 3B show the shape of the aperture inner side surface after pressure application.

FIG. 3A shows a top view and a sectional view of the light shield sheet after pressurization. FIG. 3B is an enlarged view of the aperture inner side surface of the light shield sheet after pressurization. This processing eliminates the light reflection in the part indicated by the dotted line in the sectional view of FIG. 3B, thereby preventing flare and ghost from occurring. In FIGS. 3A and 3B, the outer circumference of the light shield sheet 1 is indicated by 1b and the aperture is indicated by 1c.

In this processing, pressure is applied by pressing a hard material such as metal from above and below. The shape of the aperture inner side surface after pressurization is not limited to the one shown in FIGS. 3A and 3B. The same effect can be achieved if the thickness is reduced compared to before pressurization. Specifically, the effect of preventing flare and ghost can be obtained if the thickness of the aperture inner side surface after pressurization is 70% or less of the thickness before pressurization. Further, it is possible to reduce the thickness effectively by applying pressure while applying heat.

Figure 4:
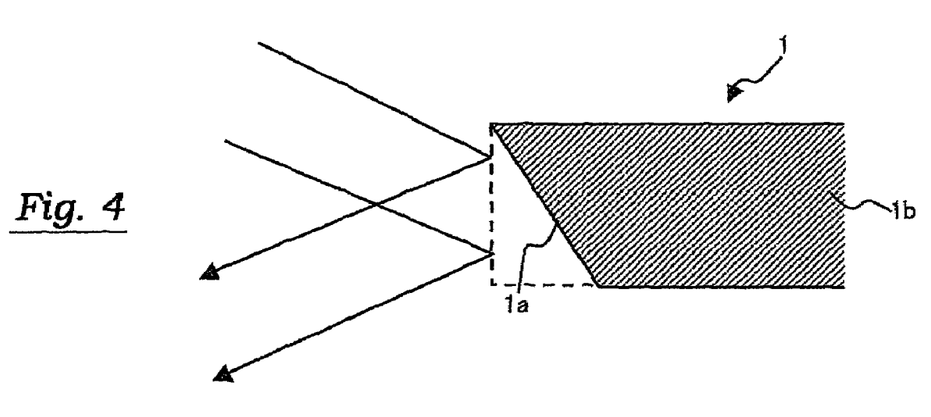
FIG. 4 is an enlarged view of an aperture inner side surface of a light shield sheet of the present invention.
Figure 5:
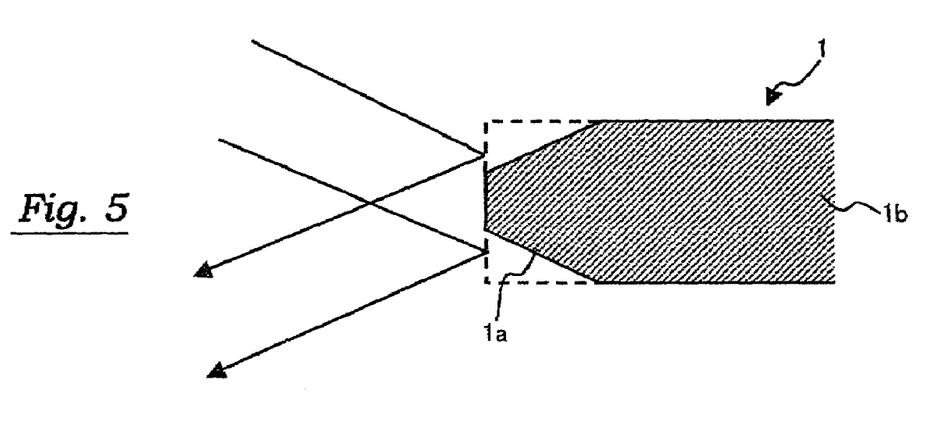
FIG. 5 is an enlarged view of an aperture inner side surface of a light shield sheet of the present invention.

The thickness of the aperture inner side surface after pressurization and before pressurization is compared above. Since the thickness of the light shield sheet 1 before pressurization is uniform, the thickness of the aperture inner side surface before pressurization is substantially the same. Though the thickness before pressurization is normally uniform, it is sufficient in this invention that the thickness of the inner circumference 1a in the periphery of the aperture 1c of the light shield sheet 1 is 70% or less of the thickness of the outer circumference 1b. The thickness may gradually increase as it gets away from the inner circumference 1a and exceed 70% of the thickness of the outer circumference 1b at some point as shown in FIG. 3. The aperture inner side surface after pressurization may have different shapes. For example, FIG. 4 shows the shape of the light shield sheet when pressure is applied only from below the inner circumference of the light shield sheet. FIG. 5 shows the shape of the light shield sheet when lower pressure is applied from above and below. Each case eliminates the light reflection as shown in FIGS. 4 and 5, thereby preventing flare and ghost from occurring.

Figure 6:
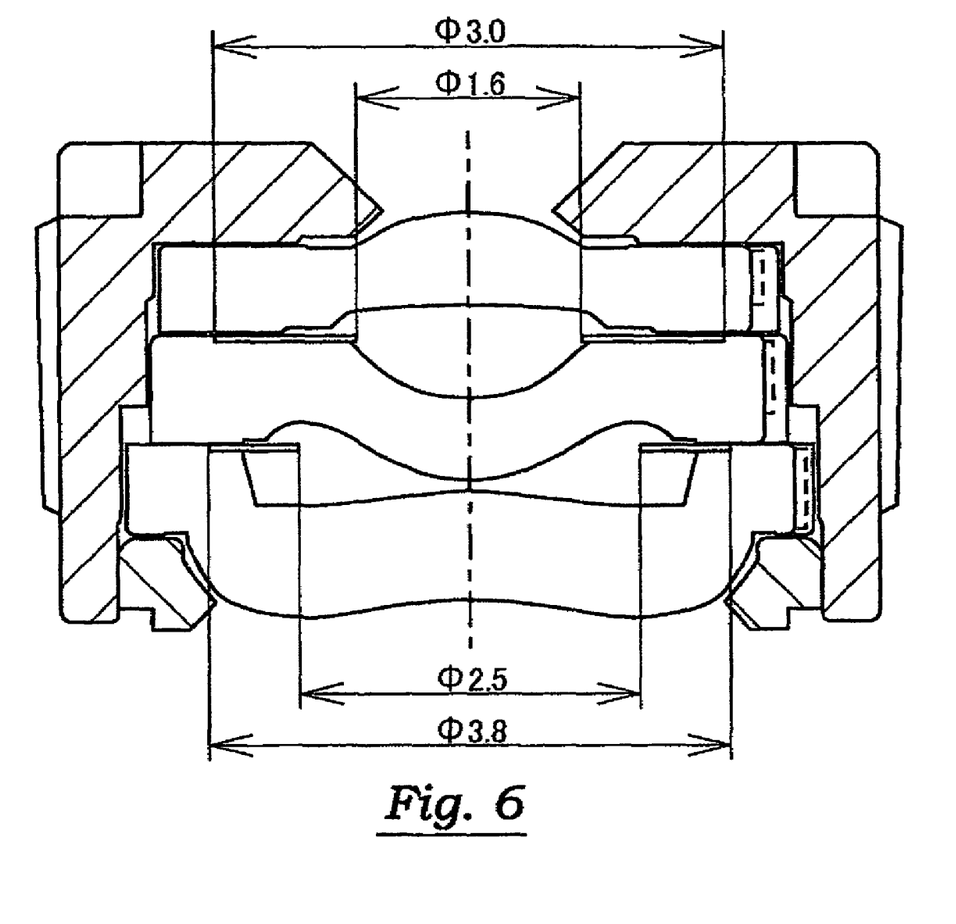
FIG. 6 is a view showing the size of a light shield sheet the present invention.

Although the pressurization can push out PET laterally to change the length of the aperture internal diameter, the effect of this change is negligible since the thickness of the light shield sheets 1 and 2 is about 50 µm, which is significantly smaller than the width. FIG. 6 is a view showing the outer diameter and the inner diameter of the light shield sheets 1 and 2 in millimeters.

Figure 7:
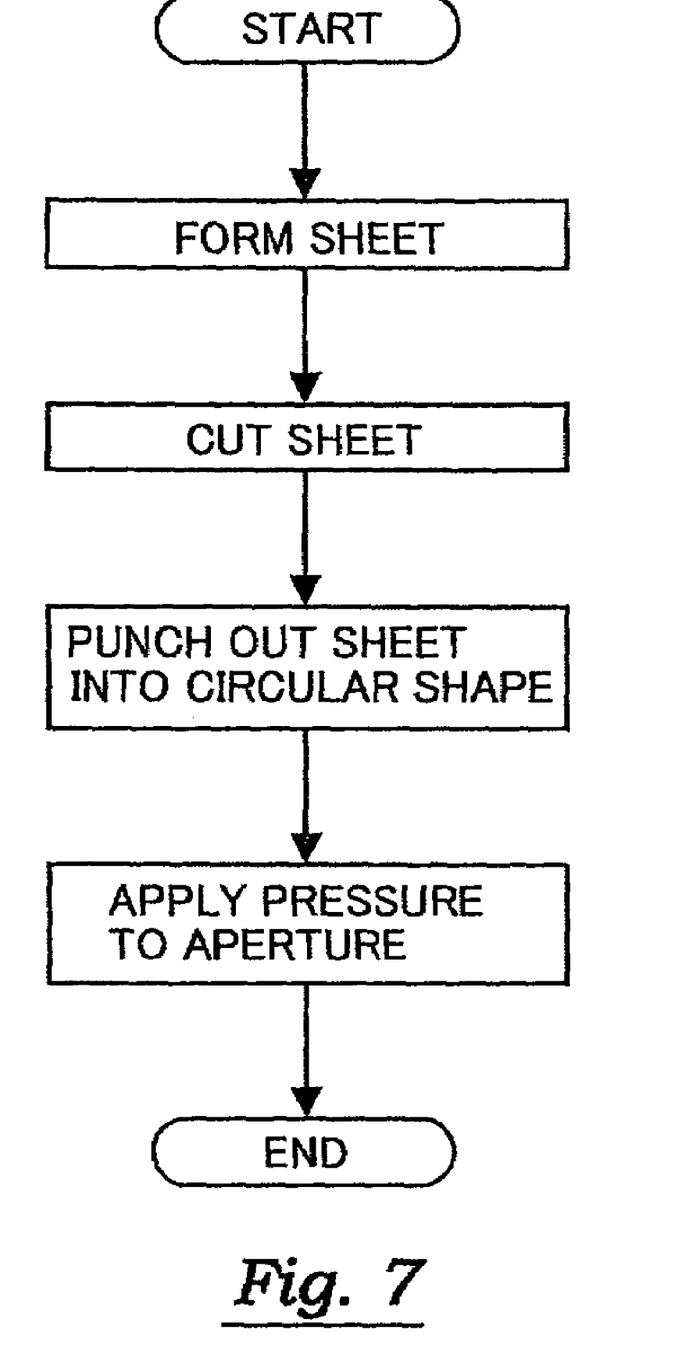
FIG. 7 is a flowchart showing a process flow of a manufacturing method of a light shield sheet of the present invention.

A method of manufacturing a light shield sheet according to the present invention is described hereinafter with reference to the flowchart of FIG. 7. First, light shield sheet material is shaped like a sheet with an extrusion device. Main material is PET, and carbon black is added thereto to give a light shielding effect. A die with a slit for controlling a sheet thickness is attached to the end of a screw of the extrusion device, and the material is extruded from the die to form a relatively thick sheet. While cooling the sheet, the material is drawn vertically and then drawn horizontally. The molecules of the PET are thereby arranged in the draw direction, thus creating the sheet with an increased tensile strength in both vertical and horizontal directions (S101). The thickness of the sheet extruded from the die is adjusted so that the sheet has a desired thickness after the drawing.

Further, since the drawn sheet has a high reflectance, it is feasible to provide blast-finishing to form a diffusion surface in order to reduce the reflectance. It is also feasible to further apply carbon black on the surface in order to increase the light shielding effect according to need.

After that, the drawn sheet is cut in rectangles (S102). The width in the cutting is about twice the outer diameter of a desired light shield sheet and the length is about 50 to 100 m. After that, each cut sheet is punched out into a circular shape. This step determines the shape of the light shield sheet (S103). It is possible to create a plurality of light shield sheets from each cut sheet. Further, the inner part is also punched out into a circular shape, thereby creating an aperture. The top view and the sectional view of the sheet are shown in FIG. 3A.

Then, pressure is applied to the aperture in the inner part to make it thinner (S104). This processing enables to prevent flare and ghost from occurring due to light reflection on the side face. The order of performing the step of punching out the sheet and the step of applying pressure to the aperture may be opposite. If the step of punching out the sheet is performed earlier, it is possible to perform the step of applying pressure highly accurately. On the other hand, if the step of punching out the sheet is performed later, it is possible to perform the step of applying pressure easily.

After the aperture in the inner part is thinned by pressurization, the process of forming the light shield sheet completes. The light shield sheet may be used for any one of the light shield sheets 1 and 2 in FIG. 1 to prevent flare and ghost from occurring due to reflection on the aperture inner side surface. Further, since this thin sheet is created by reducing the thickness of a thick sheet, it has a higher light shielding effect than a sheet that is originally thin. Though the above method reduces the thickness of the aperture in the inner part by applying pressure, it is feasible to reduce the thickness of the aperture inner side surface by cutting the aperture obliquely.

SECOND EMBODIMENT

A second embodiment describes an aperture stop.

Figure 8:
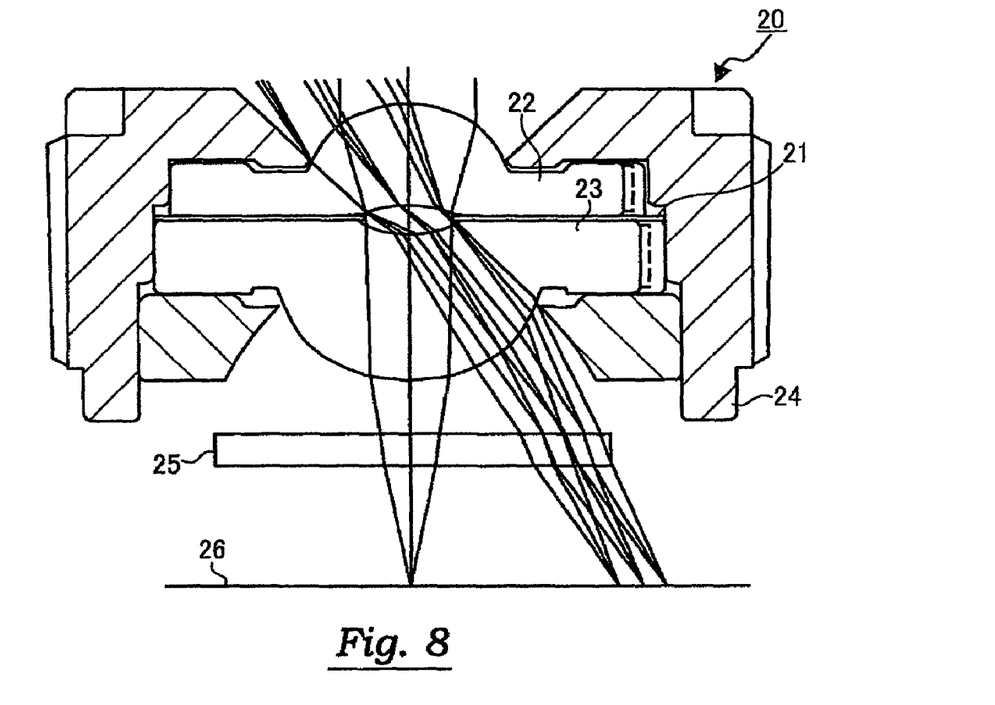
FIG. 8 is a view showing the structure of an optical apparatus of the present invention.

FIG. 8. shows the structure of an optical apparatus according to the second embodiment. As shown in FIG. 8, the optical apparatus 20 has a light shield sheet 21, lenses 22 and 23, a lens-barrel 24, a glass filter 25, and a sensor 26. The structure is the same as that of the first embodiment except for the number of light shield sheets and lenses, and thus not described here.

Figure 9:
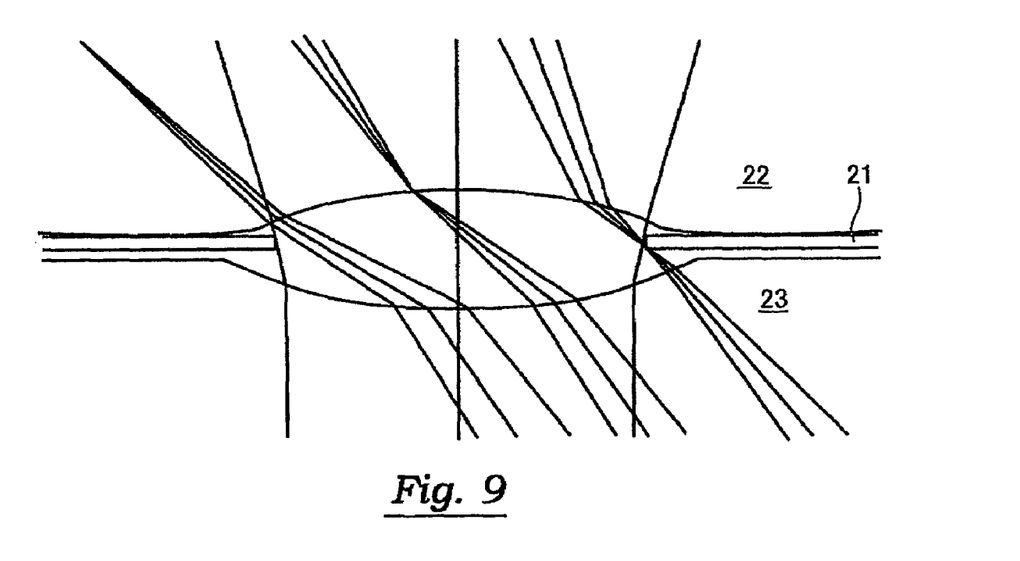
FIG. 9 is an enlarged view showing light focus in the vicinity of a light shield sheet of an optical apparatus of the present invention.

FIG. 8 shows the progress of incident light to reach the sensor in this embodiment. The chief ray of the incident light passes through the center of an aperture stop by the light shield sheet 21 that also serves as a flare stop, and light rays in the object side and the image side are inverted to produce an image on the sensor. Since the light rays in the object side and the image side cross each other at the position of the aperture stop, reflection is likely to occur on the inner side surface of the light shield sheet 21. FIG. 9 is an enlarged view showing the light focus in the vicinity of the light shield sheet 21.

Figure 10:
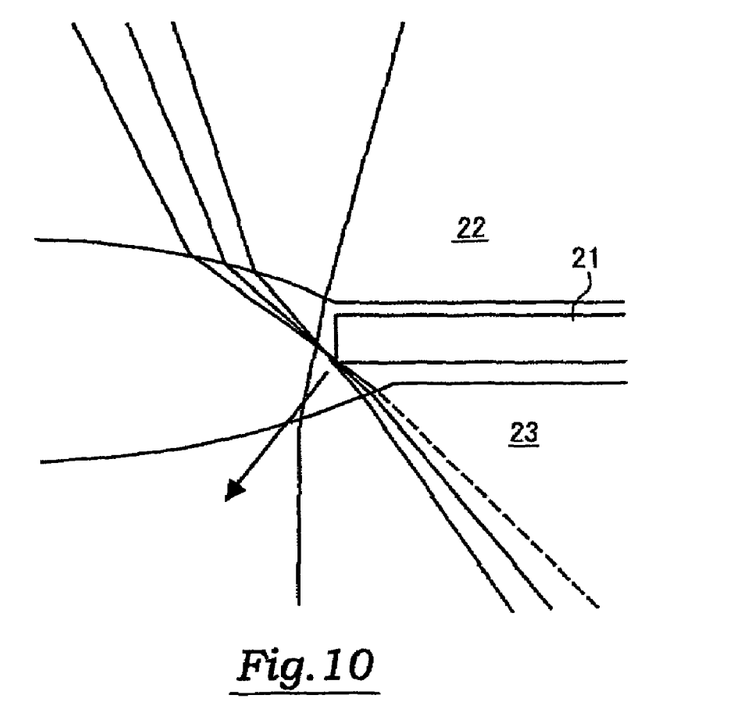
FIG. 10 is an enlarged view showing incident light that crosses in the vicinity of an aperture inner side surface of an optical apparatus.

If the light shield sheet 21 has a substantially uniform thickness, incident light is reflected on the aperture inner side surface of the light shield sheet 21, which decreases the amount of light entering the sensor 26. FIG. 10 is an enlarged view showing the incident light crossing in the vicinity of the aperture inner side surface. As shown in FIG. 10, in a conventional light shield sheet, a part of the crossed incident light does not follow the original path indicated by the dotted line but is reflected at the corner of the aperture inner side surface and does not enter the sensor 26. This reduces the amount of the light entering the sensor 26.

Figure 11:
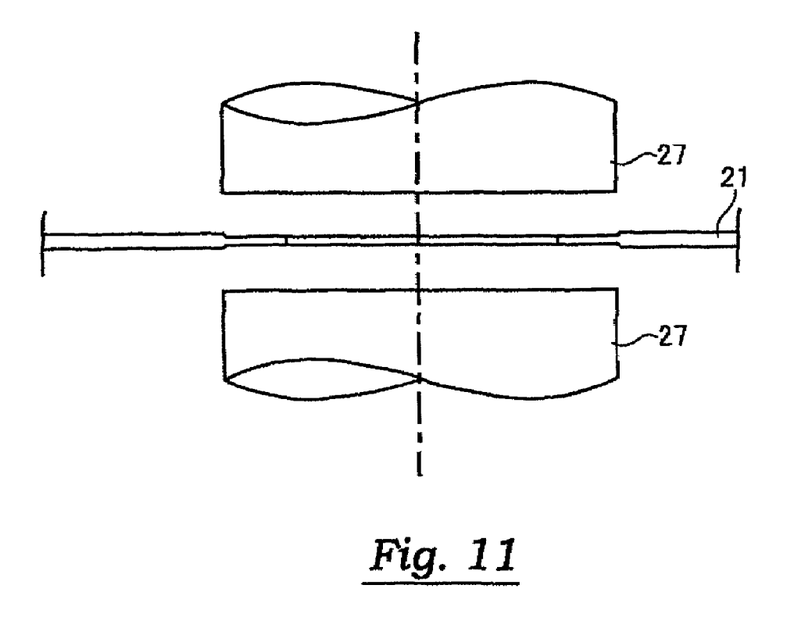
FIG. 11 is a view showing a pressure device and a light shield sheet after pressure application of the present invention.

In order to prevent reflection on the side surface without reducing the entire sheet thickness, the present invention applies pressure to the inner circumference in the periphery of the aperture inner side surface from above and below to make this part thinner. FIG. 11 is a view showing a pressure device and the light shield sheet 21 after pressure application. The pressure device 27 applies pressure to the light shield sheet 21 from above and below to reduce the thickness. In this embodiment, the thickness of the light shield sheet before pressurization is 55 μm and the thickness after pressurization is 30 μm.

Reducing the thickness of the inner circumference in the periphery of the aperture prevents the amount of light reaching the sensor from decreasing due to light reflection on the aperture inner side surface. This suppresses reduction in light intensity in this part. This embodiment does not reduce the entire sheet thickness but reduces the thickness of the inner circumference in the periphery of the aperture only because a thicker sheet is preferable in terms of light shielding effect, mechanical strength, shape stability, reliability in environments, handling ability in assembling, and so on.

THIRD EMBODIMENT

Figure 12:
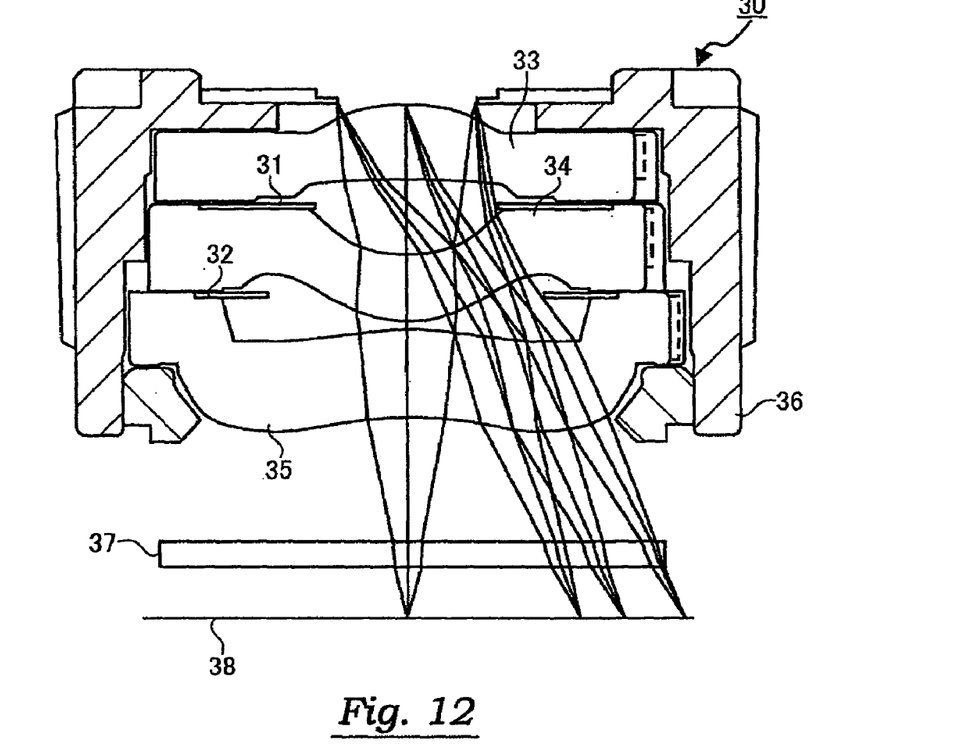
FIG. 12 is a view showing the structure of an optical apparatus of the present invention.

FIG. 12 shows the structure of an optical apparatus according to the third embodiment, which includes three lenses as in the first embodiment. This structure has a light shield film that functions as an aperture stop on the top surface of the three lenses, thus including three light shield films in total. As shown in FIG. 12, an optical apparatus 30 has light shield sheets 31 and 32, lenses 33, 34 and 35, a lens-barrel 36, a filter 37, and a sensor 38. The function of each component is the same as in the first embodiment and thus not described here. The optical apparatus having this structure has the same effect as in the first embodiment.

OTHER EMBODIMENTS

Although the above embodiments describe the structure having three lenses and two light shield sheets and the structure having two lenses and one light shield sheet, the structure may have four or more lenses and three or more light shield sheets.

EXAMPLES

An optical apparatus needs to have a low height in design particularly in application to a small size camera. If the entire optical length is shorter with respect to the sensor size, a light ray angle with respect to normal is larger. The following Table shows data on Examples 1 and 2 and Comparative Examples 1 and 2 about the two lenses in the structure of FIG. 8. An air space and an optical stop are formed between the lenses 22 and 23 having a refractive index of nd at d line.

TABLE

|  | Example 1 | Example 2 | Comparative Example 1 | Comparative Example 2 |
| --- | --- | --- | --- | --- |
| nd of lens 22 | 1.525 | 1.525 | 1.525 | 1.525 |
| Fundamental R1 (mm) of lens 22 | 1.32 | 1.24 | 1.32 | 1.24 |
| nd of air | 1.0 | 1.0 | 1.0 | 1.0 |
| Air space T(mm) | 0.26 | 0.29 | 0.26 | 0.29 |
| nd of lens 23 | 1.525 | 1.525 | 1.525 | 1.525 |
| Fundamental R2 (mm) of lens 23 | −1.61 | −1.44 | −1.61 | −1.44 |
| Aperture diameter D(mm) | ϕ0.79 | ϕ0.72 | ϕ0.79 | ϕ0.72 |
| T/D | 0.33 | 0.40 | 0.33 | 0.40 |
| Chief ray maximum exit angle (°) | 55.5 | 49.7 | 55.5 | 49.7 |
| Upper ray maximum exit angle (°) | 53.0 | 45.3 | 53.0 | 45.3 |
| Lower ray maximum exit angle (°) | 62.0 | 59.7 | 62.0 | 59.7 |
| Outer circumference thickness (mm) of optical stop 21 | 0.055 | 0.055 | 0.055 | 0.055 |
| Inner circumference thickness (mm) of optical stop 21 | 0.03 | 0.03 | 0.055 | 0.055 |
| Flare | Invisible | Invisible | Occur | Occur |

Figure 13:
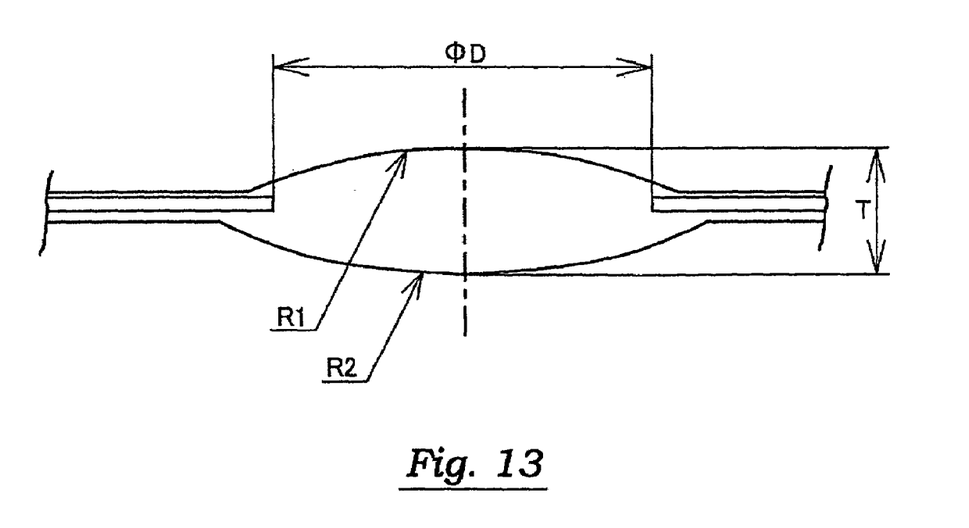
FIG. 13 is a view specifying dimensions in the vicinity of an aperture inner side surface of an optical apparatus in Examples and Comparative examples.

FIG. 13 is a view specifying dimensions in the vicinity of an aperture inner side surface of an optical apparatus in Examples and Comparative examples. If the internal diameter of an optical stop is D and the space between the surface R1 of the lens 22 and the surface R2 of the lens 23, which is the thickness of an air layer, is T, the smaller the value of T/D is, the larger a light ray angle. Example 1 and Example 2 are different in R1 and R2 of the lenses, and the value of T/D is smaller in Example 1 than in Example 2. Thus, the light ray angle is greater in Example 1 than in Example 2. In Examples 1 and 2, the inner circumference of the optical stop 21 is thinner than the outer circumference. Comparative Example 1 uses the same lens structure as in Example 1, but the thickness of the inner circumference and the outer circumference of the optical stop 21 is the same. Comparative Example 2 uses the same lens structure as in Example 2, but the thickness of the inner circumference and the outer circumference of the optical stop 21 is the same. As shown in Table, occurrence of flare was not recognized in Examples 1 and 2, but recognized in Comparative Examples 1 and 2.

In Example 1, T/D is 0.33, the maximum angle of a chief ray is 55.5°, and the maximum angle of an upper ray is 53.0°. In Example 2, T/D is 0.40, the maximum angle of a chief ray is 49.7°, and the maximum angle of an upper ray is 45.3°. Thus, the amount of reflection on the aperture inner side surface of the optical stop is likely to increase in Example 1 compared to Example 2. Therefore, the effect of preventing flare by applying the present invention to reduce the thickness of the inner circumference of the aperture is higher in Example 1 than in Example 2. The present invention is particularly effective for a small size camera with a short entire optical length such as Examples 1 and 2. Especially, the effect of the present invention is remarkable in the case where T/D is smaller than 0.5 since the inclination of the chief ray and the upper ray is great and the amount of the light reflected on the inner circumference of the light shield sheet is large.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical apparatus comprising:
a first lens refracting incident light;
a second lens refracting incident light and piled on the first lens;
a light shield sheet restricting a range of incident light by an aperture and directly interposed between the first lens and the second lens, the light shield sheet being made of at least plastic and carbon black; and
a sensor receiving incident light restricted by the aperture of the light shield sheet and refracted by the first and second lenses,
wherein a thickness of an inner circumference of the light shield sheet in a periphery of the aperture is smaller than a thickness of an outer circumference of the light shield sheet, and
the thickness of the outer circumference of the light shield sheet is 200 μm or below.

2. An optical apparatus comprising:
a first lens refracting incident light;
a second lens refracting incident light and piled on the first lens;
a light shield sheet restricting a range of incident light by an aperture and directly interposed between the first lens and the second lens, the light shield sheet being made of at least plastic and carbon black; and
a sensor receiving incident light restricted by the aperture of the light shield sheet and refracted by the first and second lenses,
wherein a thickness of an outer circumference of the light shield is included in a range of 50 to 200 μm, and a thickness of an inner circumference of the light shield sheet in a periphery of the aperture is 70% and less of the thickness of the outer circumference of the light shield sheet.

3. The optical apparatus according to claim 1, wherein a thickness of the periphery of the aperture is reduced by pressurization.

4. The optical apparatus according to claim 2, wherein a thickness of the periphery of the aperture is reduced by pressurization.

5. The optical apparatus according to claim 1, wherein the optical apparatus is used for a camera.

6. The optical apparatus according to claim 2, wherein the optical apparatus is used for a camera.

7. An optical apparatus comprising:
a first lens;
a second lens piled on the first lens; and
a light shield sheet having a thickness 200 μm or below, and fixed between the first lens and the second lens, the light shield sheet being made of at least plastic and carbon black, the light shield sheet comprising;
an aperture for restricting a range of incident light passing through;
a thicker part provided at an outer region of the light shield sheet; and
a thinner part provided at an inner region of the light shield sheet and defining the aperture, a thickness of the thinner part is thinner than a thickness of the thicker part,
wherein the thicker part of the light shield sheet is directly touching the first and second lenses, and the thinner part of the light shield sheet is provided apart from the first and second lenses.

8. The optical apparatus according to claim 7, wherein
the thickness of the thicker part of the light shield sheet is included in a range of 50 μm to 200 μm, and the thickness of the thinner part of the light shield sheet is 70% and less of the thickness of the thicker part of the light shield sheet.

9. The optical apparatus according to claim 7 further comprising:
a lens-barrel housing the first lens, the second lens, and the light shield sheet.

10. The optical apparatus according to claim 1, wherein T/D<0.5 is satisfied where D is a diameter of the aperture of the light shield sheet, and T is a distance between opposing lens surfaces of the first and second lenses.

11. The optical apparatus according to claim 2, wherein T/D<0.5 is satisfied where D is a diameter of the aperture of the light shield sheet, and T is a distance between opposing lens surfaces of the first and second lenses.

12. The optical apparatus according to claim 7, wherein T/D<0.5 is satisfied where D is a diameter of the aperture of the light shield sheet, and T is a distance between opposing lens surfaces of the first and second lenses.

* * * * *

UNITED STATES PATENT AND TRADEMARK OFFICE
CERTIFICATE OF CORRECTION

PATENT NO. : 7,457,052 B2 Page 1 of 1
APPLICATION NO. : 11/197509
DATED : November 25, 2008
INVENTOR(S) : Hiroyuki Hirata

It is certified that error appears in the above-identified patent and that said Letters Patent is hereby corrected as shown below:

Title page, item (73) - correct "Hitachi Maxwell" to "Hitachi Maxell"

Title page, item (30) - delete "Jul. 22, 2004 (JP) 2004-214461"
Title page, item (30) - delete "Mar. 24, 2005 (JP) 2005-086127" and replace with "Aug. 9, 2004 (JP) 2004-232328"

Signed and Sealed this

Seventeenth Day of February, 2009

JOHN DOLL
*Acting Director of the United States Patent and Trademark Office*